US011225579B2

(12) United States Patent
Hoffman

(10) Patent No.: US 11,225,579 B2
(45) Date of Patent: Jan. 18, 2022

(54) METHOD OF MANUFACTURING COLORED CHALK

(71) Applicant: Duane Hoffman, Shasta Lake, CA (US)

(72) Inventor: Duane Hoffman, Shasta Lake, CA (US)

( * ) Notice: Subject to any disclaimer, the term of this patent is extended or adjusted under 35 U.S.C. 154(b) by 658 days.

(21) Appl. No.: 16/173,024

(22) Filed: Oct. 29, 2018

(65) Prior Publication Data
US 2019/0136068 A1 May 9, 2019

Related U.S. Application Data

(60) Provisional application No. 62/582,061, filed on Nov. 6, 2017.

(51) Int. Cl.
| | | |
|---|---|---|
| C09D 11/00 | (2014.01) | |
| C09C 1/24 | (2006.01) | |
| C09D 13/00 | (2006.01) | |
| C09C 1/00 | (2006.01) | |
| C09C 1/02 | (2006.01) | |
| C09D 1/00 | (2006.01) | |
| C09D 4/00 | (2006.01) | |
| C09D 5/00 | (2006.01) | |
| C09K 3/00 | (2006.01) | |
| C09C 3/00 | (2006.01) | |
| C09C 3/08 | (2006.01) | |
| C09C 3/06 | (2006.01) | |

(52) U.S. Cl.
CPC .............. *C09C 1/24* (2013.01); *C09C 1/0081* (2013.01); *C09C 1/028* (2013.01); *C09D 13/00* (2013.01); *C01P 2004/80* (2013.01); *C09C 3/006* (2013.01); *C09C 3/06* (2013.01); *C09C 3/08* (2013.01)

(58) Field of Classification Search
USPC .................................. 106/31.01, 31.13, 31.9
See application file for complete search history.

(56) References Cited

U.S. PATENT DOCUMENTS

| | | | |
|---|---|---|---|
| 1,163,475 A * | 12/1915 | Silberman | C01F 5/20 423/162 |
| 2,502,130 A | 3/1950 | Downs et al. | |
| 2,765,212 A * | 10/1956 | Froelich | C01F 5/24 423/431 |
| 3,800,034 A | 3/1974 | Kircher et al. | |
| 5,127,952 A | 7/1992 | Persello et al. | |
| 9,181,436 B2 | 11/2015 | Kitagawa et al. | |
| 9,868,887 B1 * | 1/2018 | Jaskolski | C08L 1/284 |
| 2006/0246149 A1 | 11/2006 | Buchholz et al. | |
| 2008/0039248 A1 * | 2/2008 | Witzigreuter | F42B 12/40 473/577 |

(Continued)

*Primary Examiner* — James E McDonough
(74) *Attorney, Agent, or Firm* — Boudwin Intellectual Property; Daniel Boudwin

(57) ABSTRACT

A method of manufacturing colored chalk. The method for manufacturing colored chalk includes preparing a colorant, combining the colorant with a volume of water, adding magnesium carbonate to the combination of water and colorant until a paste is formed, mixing the paste until the paste is homogenous, heating the paste in a kiln until the water is removed, and grinding a mass of colored magnesium carbonate into a powder having a desired fineness. In some embodiments, the colorant includes iron oxide, charcoal, or *Camellia sinensis* leaves.

14 Claims, 1 Drawing Sheet

(56) References Cited

U.S. PATENT DOCUMENTS

| | | | |
|---|---|---|---|
| 2012/0015010 A1 | 1/2012 | Cummins et al. | |
| 2013/0192783 A1* | 8/2013 | Devenney | C08K 3/26 |
| | | | 162/181.2 |
| 2015/0203698 A1 | 7/2015 | Ozaki et al. | |
| 2016/0081905 A1* | 3/2016 | Jaskolski | A61Q 15/00 |
| | | | 106/36 |
| 2019/0117534 A1* | 4/2019 | Alimi | A61K 8/731 |

* cited by examiner

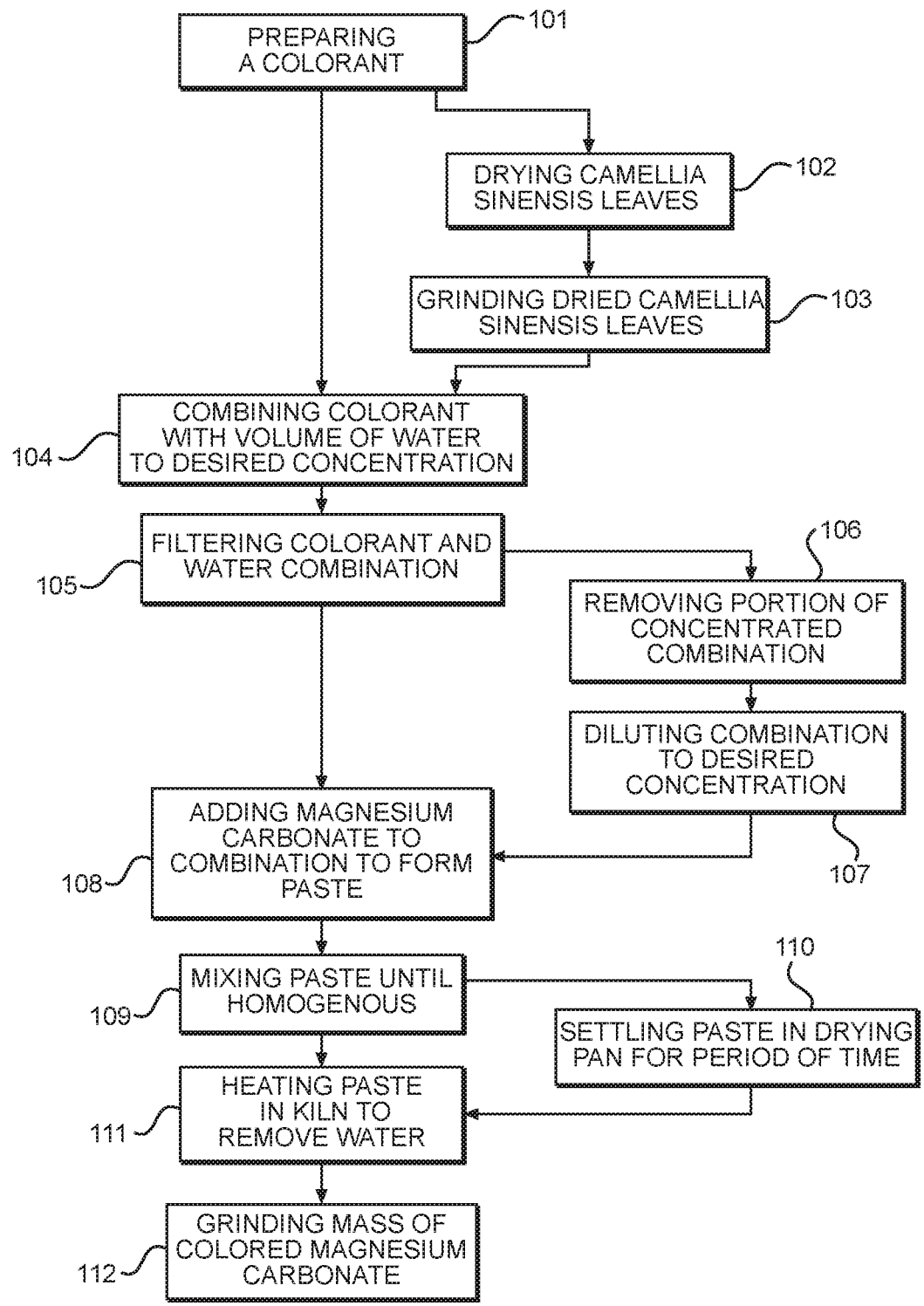

METHOD OF MANUFACTURING COLORED CHALK

CROSS REFERENCE TO RELATED APPLICATIONS

This application claims the benefit of U.S. Provisional Application No. 62/582,061 filed on Nov. 6, 2017. The above identified patent application is herein incorporated by reference in its entirety to provide continuity of disclosure.

BACKGROUND OF THE INVENTION

The present invention relates to a method of manufacturing colored chalk. More particularly, the present invention pertains to a method for manufacturing colored chalk using a colorant in combination with magnesium carbonate, wherein the colorant is prepared in various ways depending on the desired end color of the chalk.

Many people practice rock climbing or other athletic activities that are aided by the use of chalk. Chalk provides a user with an absorbent material that prevents a user's hands from gathering sweat thereon. This allows a user to maintain a grip on a surface, such as a rock formation, when the user is perspiring. Typical chalk includes no additional color, such that the chalk appears white, unlike most climbing surfaces. Chalk residue is often spread to the surface during use, thereby marring the natural appearance of the surface. This can be particularly unsightly and unappealing to many climbers who wish to leave the area in as pristine or natural state as possible. Therefore, chalk that includes coloration typical of standard climbing surfaces is desired.

In light of the devices disclosed in the known art, it is submitted that the present invention substantially diverges in design elements from the known art and consequently it is clear that there is a need in the art for an improvement to existing methods of manufacturing colored chalk. In this regard, the instant invention substantially fulfills these needs.

SUMMARY OF THE INVENTION

In view of the foregoing disadvantages inherent in the known types of methods of manufacturing colored chalk now present in the known art, the present invention provides a method of manufacturing colored chalk wherein the same can be utilized for providing convenience for the user when desiring to create chalk having various hues to replicate natural rock surfaces.

The present method comprises preparing a colorant, combining the colorant with a volume of water, adding magnesium carbonate to the combination of water and colorant until a paste is formed, mixing the paste until the paste comprises a homogenous mixture, heating the paste in a kiln until the water is removed therefrom, leaving a mass of colored magnesium carbonate, and grinding the mass into a powder having a desired fineness. In some embodiments, the colorant comprises iron oxide. In another embodiment, the iron oxide is selected from a group consisting of FE2O3 Cas#1309-37-1 and FE3O4 Cas#1317-61-9. In some embodiments, the paste comprises one pound of magnesium carbonate, 50 grams of colorant, and one-half gallon of water. In another embodiment, the preparation of the colorant comprises drying *Camellia sinensis* leaves. In other embodiments, the method further comprises grinding the *Camellia sinensis* leaves to a desired fineness. In yet another embodiment, the method further comprises steeping the dried *Camellia sinensis* leaves in the volume of water for a desired amount of time. In some embodiments, the colorant is added to the volume of water such that the colorant is maximally concentrated therein. In another embodiment, the method further comprises removing a portion of the combination of colorant and the volume of water and diluting the portion of the combination to a desired concentration. In other embodiments, the method further comprises filtering the combination of colorant and water through a filter configured to remove particulate debris therefrom.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a flow diagram of an embodiment of the method for manufacturing colored chalk.

DETAILED DESCRIPTION OF THE INVENTION

Reference is made herein to the attached drawings. Like reference numerals are used throughout the drawings to depict like or similar elements of the method for manufacturing colored chalk. The figures are intended for representative purposes only and should not be considered to be limiting in any respect.

Referring now to FIG. 1, there is shown a flow diagram of an embodiment of the method for manufacturing colored chalk. The method of manufacturing colored chalk comprises preparing 101 a colorant, wherein the colorant can comprise a variety of materials configured to dye magnesium carbonate to a desired hue, such that the resulting chalk more readily matches the natural color of a rock face or mountainside. In this way, the user can ensure that no visible chalk mars the appearance of the rock face, leaving a pristine and natural environment after engaging in rock climbing. Specifically, the colorant is contemplated to include various hues of iron oxide to produce reds, greys, and black colored chalk, and *Camellia sinensis* to produce various hues of tan. These colors provide a range of options for various types of rock surface that a user may desire to climb.

In embodiments wherein the colorant comprises iron oxide, the iron oxide can comprise various different chemical structures to allow for different colors of resulting chalk. In some embodiments, the iron oxide is selected from a group consisting of FE2O3 Cas#1309-37-1 and FE3O4 Cas#1317-61-9, such that the resulting chalk comprises a red or black hue, respectively. Iron oxide can simply be prepared 101 via obtaining or otherwise grinding existing iron oxide to a desired consistency, such that the iron oxide will readily dissolve in a volume of water.

In other embodiments, the colorant comprises *Camellia sinensis*, wherein the chalk produced thereby results in a tan hue. Preparation of the *Camellia sinensis* requires leaves of the *Camellia sinensis* plant to be dried 102 and subsequently ground 103 to a desired consistency, such that the *Camellia sinensis* comprises an increased surface area, allowing more rapid and efficient leeching of the *Camellia sinensis* within the volume of water. The drying 102 step allows the *Camellia sinensis* to be more easily ground 103 to a desired consistency, while simultaneously increasing the concentration of desirable qualities, such as color, to be leeched therefrom.

Following preparation 101, the colorant is then combined 104 with a volume of water, such that a desired concentration of colorant to water is achieved. Wherein a richer color is desired, additional colorant is added to the volume of water, such that the colorant is more concentrated therein, while when a more subdued hue is desired, a smaller quantity of colorant can be combined 104 with the volume of water. In alternate embodiments, the volume of water is heated to aid in the dissolution of leeching of colorant therein. In some embodiments, an exemplary ratio of colorant to water comprises 50 grams of colorant to one-half gallon of water, however alternate amounts of colorant including maximum concentration within water are also contemplated. Additionally, in embodiments wherein *Camellia sinensis* is used, the combination 104 step further comprises steeping the *Camellia sinensis* within the volume of water for an amount of time to achieve a desired concentration of color. In some embodiments, the *Camellia sinsensis* is steeped within the volume of water for 45 minutes, while the volume of water is heated to boiling. In some embodiments, once the desired level of concentration is achieved, the colorant and water combination can then be filtered 105 through a filter configured to remove particulate therefrom, resulting in a purely aqueous solution of colorant and water. In this way, the resulting chalk produced through this method does not comprise any particulate that could prove harmful to the environment or rock surface to be climbed.

In some embodiments, to streamline the manufacturing process, a single base concentration of colorant and water is used, which can then be adjusted to achieve a desired concentration of colorant. In these embodiments, the colorant is combined 104 with the volume of water such that the colorant is maximally concentrated therein. The user can then remove 106 a portion of the maximally concentrated combination and dilute 107 the combination with additional water to achieve a desired concentration therein. In this way, the user can increase the efficiency of manufacturing large quantities of colored chalk in various gradients of hue.

A quantity of magnesium carbonate is then added 108 to the combination of colorant and water, such that the colorant and water combination dyes the magnesium carbonate a desired color. In some embodiments, one pound of magnesium carbonate is added to one-half gallon of the water/colorant combination, such that a desired color is achieved without excessive desaturation due to the base white color of the magnesium carbonate. The resulting paste formed by the adding magnesium carbonate to the water/colorant combination is then mixed 109 until the paste is homogenous, such that the desired color is achieved throughout the entire mixture. In this way, the color of the resulting colored chalk is consistent.

In some embodiments, the resulting paste is then settled 110 in a drying pan for a desired period of time to allow excess moisture within to evaporate at room temperature. In some embodiments, the period of time comprises at least 48 hours. In this way, the paste is simultaneously dried therein, while allowing the colorant to further propagate through the paste to achieve a consistent color therethrough should the mixing 109 have been insufficient. The paste is then heated 111 in a kiln until all moisture is removed therefrom. In some embodiments, the kiln is heated to a temperature between 90-100 degrees Fahrenheit. The previous optional step of settling 110 within a drying pan at room temperature allows the user to expend less energy heating 111 the kiln, thereby minimizing expense. Once the paste has been thoroughly dried, the resulting mass of colored magnesium carbonate is then ground 112 to a desired level of fineness for use during rock climbing. Various differing levels of fineness are contemplated, as differing granularity of chalk can be preferred for different purposes when rock climbing.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of manufacturing colored chalk, comprising:
   preparing a colorant;
   combining the colorant with a volume of water;
   adding magnesium carbonate to the combination of water and colorant until a paste is formed;
   mixing the paste until the paste comprises a homogenous mixture;
   heating the paste in a kiln until the water is removed therefrom, leaving a mass of colored magnesium carbonate;
   grinding the mass into a powder having a desired fineness.

2. The method of manufacturing colored chalk of claim 1, wherein the colorant comprises iron oxide.

3. The method of manufacturing colored chalk of claim 2, wherein the iron oxide is selected from a group consisting of FE203 Cas#1309-37-1 and FE304 Cas#1317-61-9.

4. The method of manufacturing colored chalk of claim 1, wherein the paste comprises one pound of magnesium carbonate, 50 grams of colorant, and one-half gallon of water.

5. The method of manufacturing colored chalk of claim 1, wherein the colorant comprises *Camellia sinensis*.

6. The method of manufacturing colored chalk of claim 5, wherein the preparation of the colorant comprises drying *Camellia sinensis* leaves.

7. The method of manufacturing colored chalk of claim 6, further comprising grinding the dried *Camellia sinensis* leaves to a desired fineness.

8. The method of manufacturing colored chalk of claim 5, further comprising steeping the *Camellia sinensis* leaves in the volume of water for a desired amount of time.

9. The method of manufacturing colored chalk of claim 1, wherein the colorant is added to the volume of water such that the colorant is maximally concentrated therein.

10. The method of manufacturing colored chalk of claim 9, further comprising removing a portion of the combination of colorant and the volume of water and diluting the portion of the combination to a desired concentration.

11. The method of manufacturing colored chalk of claim 1, further comprising filtering the combination of colorant and water through a filter configured to remove particulate debris therefrom.

12. The method of manufacturing colored chalk of claim 1, wherein the paste is dried in the kiln at a temperature between 90 and 100 degrees Fahrenheit.

13. The method of manufacturing colored chalk of claim 1, further comprising allowing the paste to settle in a drying pan at room temperature for a period of time before heating the paste in the kiln.

14. The method of manufacturing colored chalk of claim 13, wherein the period of time comprises 48 hours.

* * * * *